United States Patent
Sareen et al.

(10) Patent No.: US 9,734,232 B2
(45) Date of Patent: Aug. 15, 2017

(54) SYSTEMS AND METHODS FOR META-MODEL BASED DATA TRANSACTIONS

(71) Applicant: NetApp, Inc., Sunnyvale, CA (US)

(72) Inventors: Apoorva Sareen, Bangalore (IN); Swaminathan Ramany, Bangalore East (IN)

(73) Assignee: NETAPP, INC., Sunnyvale, CA (US)

( * ) Notice: Subject to any disclaimer, the term of this patent is extended or adjusted under 35 U.S.C. 154(b) by 541 days.

(21) Appl. No.: 14/265,050

(22) Filed: Apr. 29, 2014

(65) Prior Publication Data

US 2015/0032783 A1  Jan. 29, 2015

(30) Foreign Application Priority Data

Jul. 26, 2013  (IN) .......................... 3346/CHE/2013

(51) Int. Cl.
G06F 7/00 (2006.01)
G06F 17/30 (2006.01)
G06F 3/06 (2006.01)

(52) U.S. Cl.
CPC .......... *G06F 17/30595* (2013.01); *G06F 3/06* (2013.01); *G06F 17/30292* (2013.01)

(58) Field of Classification Search
None
See application file for complete search history.

(56) References Cited

U.S. PATENT DOCUMENTS

| | | | | |
|---|---|---|---|---|
| 2004/0006506 A1* | 1/2004 | Hoang | ................... | G06Q 10/10 705/14.65 |
| 2006/0080426 A1* | 4/2006 | Brunswig | ................. | G06F 8/20 709/223 |
| 2007/0234328 A1* | 10/2007 | Wilson | ................ | G06F 11/3672 717/162 |
| 2010/0205220 A1* | 8/2010 | Hart | ................. | G06F 17/30958 707/797 |
| 2013/0246996 A1* | 9/2013 | Duggal | ..................... | G06F 8/35 717/104 |

* cited by examiner

*Primary Examiner* — Thu Nga Nguyen
(74) *Attorney, Agent, or Firm* — Klein, O'Neill & Singh, LLP

(57) ABSTRACT

A system and method for transacting data using meta-models to express data relationships is provided. In some embodiments, the method comprises requesting, from a computing system, a meta-model expressing a data relationship. The data relationship relates to a topology of a deployed computing system, and the requesting specifies the meta-model from among a plurality of data models stored within the computing system. The requested meta-model is received from the computing system, and at least a portion of the meta-model is provided to an application. A data transaction based on the meta-model is received from the application and issued. In some such embodiments, a navigational interface is provided in order to navigate the meta-model and specify the portion to provide.

19 Claims, 3 Drawing Sheets

SYSTEMS AND METHODS FOR META-MODEL BASED DATA TRANSACTIONS

TECHNICAL FIELD

The present description relates to distributed data management and, more specifically, to a meta-model-based method of transacting data between computing systems.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out the storage architecture to meet these expectations enables the next generation of applications, which is expected to bring even greater demand.

One method of managing these large amounts of data is to host a relational database on a central system or system cluster and allow clients to interact with database. In this way, the clients can read, write, and manipulate the data remotely. This conventional server/client architecture has been proven effective and reliable. However while relational databases can scale and have been successfully deployed in the petabyte ($10^{15}$ bytes) range, they do not scale easily and require a considerable investment in hardware and infrastructure. In particular, the overhead required to query and update databases of this size is non-trivial, and the burden of database management falls almost entirely on the serving system or cluster.

An example of a system that manages very large data sets is a customer support system. For instance, AutoSupport™ ("ASUP") is the "call home" technology available to NetApp, Inc. customers that subscribe to NetApp's AutoSupport™ service. ASUP enables products to automatically send configuration, log, and performance data through SMTP, HTTP or HTTPS protocols to backend data centers. Technicians can use the ASUP data reactively to speed the diagnosis and resolution of customer issues and proactively to detect and avoid potential issues. Some implementation utilize a Network File System (NFS) source, a Relational Database Management System (RDBMS) target, and decoupled Java and perl processes to process the data. However, the conventional implementation using NFS, RDBMS, and Java and perl is not easily scalable to support future products or to accommodate increasing data load.

In this example and others, a need exists for improvements to the conventional relational database paradigm. Improvements that increase access speed, reduce network transactions, shift a portion of the data management burden to the requesting device, and reduce database complexity have the potential to pay dividends in both the short and long term.

BRIEF DESCRIPTION OF THE DRAWINGS

The present disclosure is best understood from the following detailed description when read with the accompanying figures.

DETAILED DESCRIPTION

Figure 1:
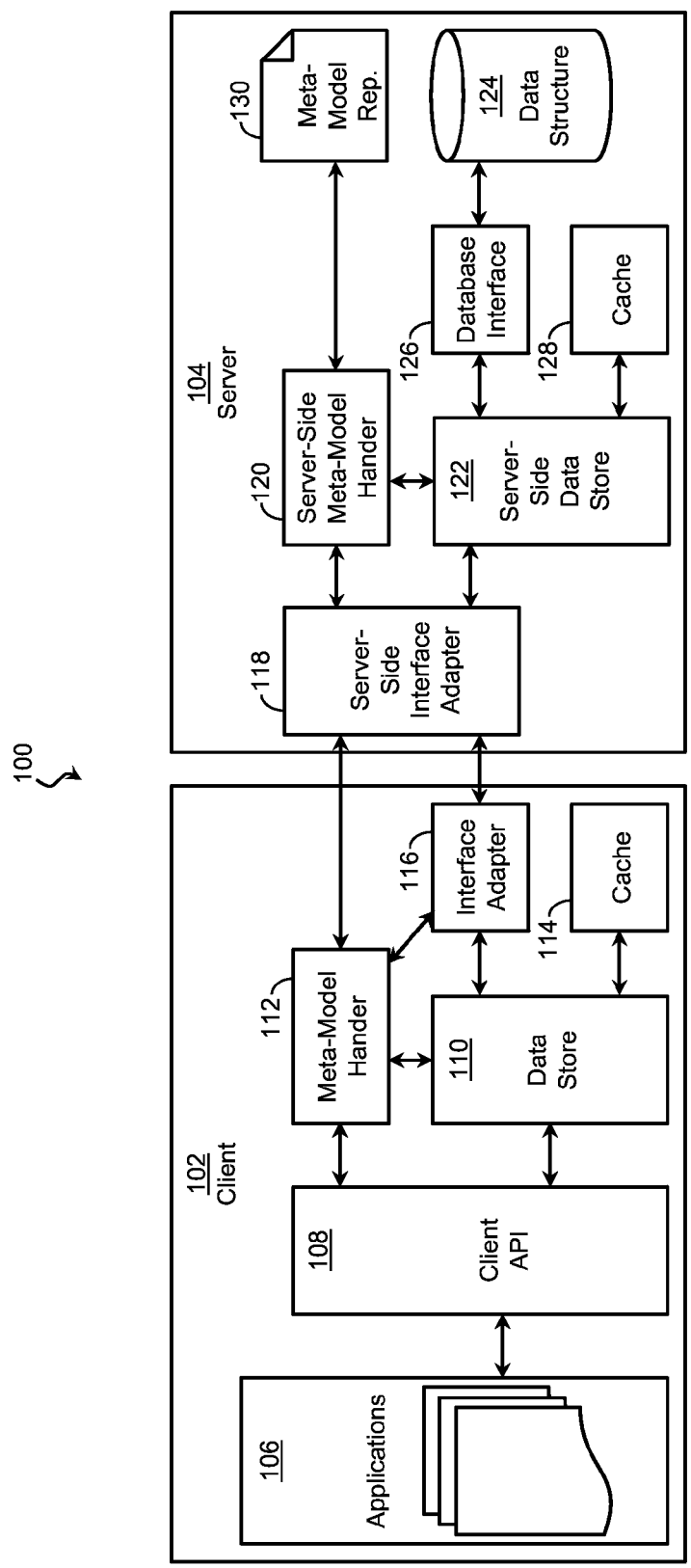
FIG. 1 is a schematic diagram of an exemplary architecture according to aspects of the present disclosure.

All examples and illustrative references are non-limiting and should not be used to limit the claims to specific implementations and embodiments described herein and their equivalents. The headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer program products that handle the exchange of large amounts of data. In one example, an architecture is disclosed that utilizes meta-models to express data relationships. A client and server first exchange the meta-model of a data schema and then, using the meta-model, the client requests specific data records of interest and constructs relationships. As merely one advantage, this allows the client to combine multiple individual transactions in order to reduce the number of exchanges with the server. In addition, this frees client applications from maintaining their own copies of a meta-model.

Although the scope of embodiments is not limited to any particular use case, one example includes a client with an automated support application that exchanges configuration, log, and performance data with a server or server cluster in order to enable remote management and troubleshooting. In order to reduce the number of data transactions, first the meta-models are exchanged from server to client, and, using the meta-models, the relevant support data is requested by the client in a single transaction. In order to support a wide range of applications and clients in the field, in one example, the meta-models are cross-referenced by version, and each application may specify the version to receive.

FIG. 1 is a schematic diagram of an exemplary architecture 100 according to aspects of the present disclosure. For clarity and ease of explanation, in the illustrated embodiment, the architecture 100 is divided into a client system 102 and a server system 104. However, in various embodiments, the architecture 100 includes multiple clients 102 in communication with a single server 104 and/or individual clients 102 in communication with multiple servers 104. While the client 102 and the server 104 are referred to as singular entities, each may include any number of computing devices and may range from a single computing system to a system cluster of any size. In one example, client system 102 is associated with a deployed computing cluster (e.g., a cluster in operation at a customer site). Continuing with the example, the server system 104 is associated with an automated support backend providing support for the deployed system.

Turning first to the client system 102, the client 102 has the ability to run applications 106. Applications 106 include computing software that, when executed by the client 102, is operable to perform any suitable computing tasks. Frequently, these tasks include manipulating locally stored data as well as data stored remotely on the server system 104. For example, in the case of an automated support application, the application 106 may exchange configuration, status, log, and performance data with the server 104 in order to diagnose issues and resolve problems.

For reasons of security, data management, reliability, and ease of maintenance, it may be beneficial to prevent the applications 106 from accessing data directly. Accordingly, the client may include a client API (Application Programming Interface) 108 that provides a set of commands for requesting and manipulating remote data such as data stored within the server 104. In this way, the client API offers a level of abstraction that allows the applications 106 to remain agnostic to the particular datapath used to communicate with the server 104. In addition to data access commands, the client API 108 may provide various interfaces for manipulating meta-model data, which are described in detail below.

As seen in FIG. 1, the client API 108 provides a mechanism for the applications 106 to access the data store 110. The data store 110 performs the data storage and retrieval tasks from a variety of remote systems including the server 104. In a typical example, the data store 110 receives a data transaction from the client API 108 directed to a data record stored on the server 104. The data store 110 then requests the relevant data record from the server 104 via the interface adapter 116. In some embodiments, the data store 110 may include a data record cache 114. If a data transaction misses in the cache 114, it may be forwarded to the server via the interface adapter 116.

For transactions that involve meta-models, the client API 108 is also in communication with a meta-model handler 112. A meta-model describes a relationship between individual pieces of data. In essence, the meta-model explains what data means and how it is related to other data. In an example, a data record includes a model number and a serial number. The meta-model for the data record specifies that a serial number has a many-to-one relationship with a model number, meaning that a device associated with a serial number is also associated with one particular model number and that many other serial number are also associated with the same model number. Meta-models are also used to describe relationships between data records. In an example, a first data record identifies a data storage device (e.g., a storage drive) and one or more attributes thereof. A second data record identifies a RAID (Redundant Array of Inexpensive Disks) cluster and one or more attributes thereof. An exemplary meta-model specifies that the data storage device of the first data record is one of the storage devices that make up the RAID cluster of the second data record. In other exemplary embodiments, meta-models express relationships used to assemble a database of diagnostic information for automated support. These relationships may pertain to elements of a system topology such as physical, logical, network, and virtual configurations. As examples, some such meta-models include relationships that relate to physical locations, corresponding host bus adapters, RAID groups, logical volumes, and/or other aspects of the topology of a deployed system. Using these meta-models, the applications 106 are able to correctly format data sent to the server 104 and correctly parse data records received. Accordingly, in the example of an automated support application, the application uses the meta-models to format and parse support data in order to report system status or to diagnose a failure.

The meta-models may specify the relationships using any suitable format. For example, in some embodiments, the meta-models are expressed in GraphML, an XML-based method of expressing relationships using nodes and edges (connections between nodes). An example of such a meta-model is shown below.

```
<graph id="meta-model" edgedefault="directed" >
    <node id="cluster">
        <data key="nodeId">cluster</data>
        <data key="key.attributes">cluster_id</data>
    </node>
    <node id="system">
        <data key="nodeId">system</data>
        <data key="key.attributes">system_id</data>
    </node>
    ..
    .
    <edge id="e16" source="cluster" target="system" />
    <edge id="e17" source="cluster" target="vserver" />
    ..
    .
</graph>
```

In the real-world topology to which the example meta-model applies, a cluster is a collection of systems. Clusters also contain vservers (virtual servers operated by the systems). In this meta-model, "cluster" data objects are related to "system" objects by edge "e16." Because this is a directed graph (indicated by "edgedefault='directed'" in the header), the edge source, "cluster," can be said to contain the edge target, "system," and thus, "cluster" may be referred to as a parent of "system." Likewise, edge "e17" specifies that "cluster" also contains "vserver." The relationships expressed within the meta-models can be quite complex, and in some embodiments, a nested meta-model is used to represent the relationships in an orderly fashion.

At a high level, the meta-model handler 112 retrieves a particular meta-model from the server 104 and provides it to the applications 106. This allows the applications 106 to contextualize the corresponding data records. For purposes of flexibility and backward-compatibility, a server 104 may maintain multiple meta-models or multiple versions of a meta-model. Client applications 106 may specify a particular version of a particular meta-model within the request even if the model has been supplanted by another version or model. This allows developers to update and improve data structures and relationships without breaking existing applications. Changes which may affect the existing applications may be added to a side model or incremented version that is requested by those applications 106 that support the changes. In addition to offering stability, the ability to request specific meta-models reduces network burden by not exchanging irrelevant meta-models between the client 102 and server 104. In this manner, the meta-model handler 112 is able to request and provide meta-models on demand.

In order to retrieve meta-models, the meta-model handler 112 is operable to communicate with the server 104. In some embodiments, the meta-model handler 112 sends requests for meta-model data to the client interface adapter 116, although in the illustrated embodiment, the meta-model handler 112 is operable to exchange meta-model data with the server 104 independently. The exchange of meta-models with the server 104 is described in more detail in the context of the interface adapter 116.

The meta-model handler 112 is not limited to merely retrieving and providing meta-models. In various embodiments, the meta-model handler 112, in conjunction with the client API 108, offers a meta-model API that allows applications 106 to specify a portion of the meta-model to be provided to the application, instead of providing the entire model. In many embodiments, the meta-model API allows an application 106 to specify and retrieve the portion without sending any further requests to the server system 104. The meta-model API may take any suitable form, and, for reference, three exemplary meta-model API are described below.

In some embodiments, applications 106 utilize a navigational API offered by the meta-model handler 112 to retrieve a portion of the meta-model from the handler 112. The navigational API allows an application 106 to assemble a path that describes the portion to retrieve. For example, a path may take the form of "cluster>vserver>volume>aggregate." Paths are not necessarily linear and may include multiple branches. At any time, the application may utilize the path to retrieve data. In an example, data for all objects stored in the current path is fetched in a single request using a command such as getData("all"). The navigational API does not limit programs to only using the path to retrieve data. Accordingly, in a further example, a program may use a meta-model API command such as getData(ObjectName) to selectively fetch objects independent of the current path.

An exemplary navigational API includes the following commands:
  getRoot( ): Return root object of the meta-model. This is a shortcut to reset back to Root object.
  getParents( ): Return list of all in degree objects to an existing object in the meta-model graph. All such object would have one to many relationship with the current object in question
  getParent(objectName): Return the parent object as specified by the object name.
  getChildren( ): Return List of all out degree objects to an existing object in the meta-model graph. All such object would have many to one relationship with the current object in question
  getChild(objectName): Return the child object as specified by the object name.
  getAll( ): return list of both in degree and out degree (parents and children) for a given object.
  getAll(ObjectName): Return the object for the object name specified only if it has a direct relationship with the existing object.

In the example, an application may begin by initializing an instance of the meta-model and by calling the getRoot( ) command. The getRoot( ) command causes the meta-model handler 112 to determine an appropriate version of the meta-model and to request the meta-model from the server system 104 if it is not already loaded within in the handler 112. This request of a meta-model from the server 104 is disclosed in more detail below. Once the meta-model is obtained, the meta-model handler 112 then returns a root object to the application 106.

In the example, once the root object is obtained, other commands (e.g., getParents, getChildren, getAll, etc.) may be used to get objects related to a given object. For example, vserver.getParents( ) would return an array containing ["cluster"] in a meta-model where "cluster" is the parent of "vserver." As the application 106 navigates the meta-model, the objects are added to the traversal path for the application session.

In some embodiments, the meta-model handler 112 and client API 108 may offer a viewing API for retrieving portions of the meta-model without changing a current path. Thus, a viewing API is often offered in conjunction with a navigational API. The viewing API allows programs to visualize the meta-model relationships without interfering with the path-based commands of the navigational API.

In some embodiments, the meta-model handler 112 and client API 108 may offer a filter API that allows applications 106 to specify search terms. An exemplary filter API includes filter commands such as setFilter(data key, search term) which returns only those objects for which the data key value matches the search term. In an embodiment, a program issues the command vserver.setFilter("name", "vs1") to obtain only "vserver" objects where "name" matches "vs1." In some embodiments, the commands of the filter API can be used in conjunction with those of the navigational API and/or viewing API.

These APIs allow applications 106 to utilize relevant portions of a meta-model without necessarily providing the entire meta-model to each application 106. This allows multiple applications 106 to share a single copy of a meta-model and relieves the applications 106 from the burden of maintaining individual copies. It also forces consistency and uniformity across applications 106. This may prove especially beneficial where different product lines and product versions are supported through a unified umbrella of tools.

Turning now to the interface adapter 116, the interface adapter 116 handles communications between the client 102 and server 104 over any communications infrastructure such as a Local Area Network (LAN), Wide Area Network (WAN), and/or the Internet. To do so, the interface adapter 116 may be configured to use any suitable protocol at any suitable level of abstraction. In an exemplary embodiment, the interface adapter 116 supports a Representational State Transfer (REST) model over a TCP/IP interface. REST is web service design model that allows remote clients 102 to store and access data using simple HTTP commands and is known for providing simplicity and low-latency response times. Of course, the scope of embodiments may include any appropriate interface, whether for web services or otherwise.

The interface adapter 116 may provide and receive commands directed to data records, to meta-models, or to both. For example, in some embodiments, the interface adapter 116 provides a request for a meta-model formatted as a REST-style instruction such as an HTTP URI (e.g., "http:// . . . ") or HTTP GET (e.g., "GET . . . ") over the Internet to the server 104. The meta-model handler 112 may also be operable to provide and receive such commands without the assistance of the interface adapter 116. Accordingly, in some such embodiments, the meta-model handler 112 provides a meta-model transaction formatted as a REST-style instruction over the Internet or other network to the server 104.

Turning now to the server system 104, the server 104 includes an interface adapter 118 that is the counterpart to the interface adapter 116 of the client 102. That is, interface adapters 116 and 118 are capable of communicating over a communications network using at least one protocol. The server-side interface adapter 118 may also be operable to communicate directly with the client meta-model handler 112 over the communications network. In an exemplary embodiment, the interface adapter 118 supports communication with the client interface adapter 116 and the client meta-model handler 112 using a REST model over a TCP/IP interface.

Communications relating to data records may be relayed to a server-side data store 122, while communications relating to meta-models may be relayed to a server-side meta-model handler 120. The server-side data store 122 may be substantially similar to the client data store 110. Accordingly, the data store 122 performs data storage, retrieval, and manipulation tasks. In the course of such tasks, the data store 122 may send and receive data records from a data structure 124 via a database interface 126. To improve response time, in some embodiments, the data store includes a cache 128. If a data transaction misses in the cache 128, it may be forwarded to the database interface 126.

Data structure 124 refers generally to any suitable data structure, and in various embodiments, includes a relational database such as Oracle Database, MySQL (also from Oracle), Apache HBase, or Microsoft SQL. Data structure 124 may also include or consist of a collection of flat files (i.e., files that contain few or no relationships between the data records). In one particular example thereof, data structure 124 is a single flat file distributed across multiple discrete computer systems that make up the server 104. Several file storage systems are capable of handling large distributed files such as Apache Hadoop/Hadoop Distributed File System (HDFS) and Google File System.

The server-side meta-model handler 120 may also be substantially similar to the client meta-model handler 112. In that regard, the server-side meta-model handler 120 may retrieve and provide meta-models for use in determining data relationships. The meta-model handler 120 has access to a number of meta-models stored in a meta-model repository 130. As described above, the server 104 may maintain multiple meta-models and/or multiple versions within the repository 130. In the illustrated embodiment, the meta-model data repository 130 is separate and distinct from a corresponding data structure 124. However, in various further embodiments, some or all of the meta-models are incorporated into the data structure 124 and may be an integral part of a corresponding data record. The meta-model handler 120 may be operable to retrieve models on behalf of clients 102 as well as on behalf of applications running on the server 104.

As disclosed above, each of the client 102 and the server 104 may include any number of computing devices. These computing devices may take the form of a desktop computing device, a personal computing device, a laptop, a personal digital assistant, a tablet computer, a mobile communications device, and/or another suitable configuration. The computing devices may include a processor such as a microcontroller or a dedicated central processing unit (CPU), a non-transitory computer-readable storage medium (e.g., a hard drive, random access memory (RAM), a compact disk read only memory (CD-ROM), etc.), a video controller such as a graphics processing unit (GPU), and a network communication device such as an Ethernet controller or wireless communication controller. In that regard, in some embodiments, the computing devices of the client 102 and the server 104 are programmable and are programmed to execute processes including those associated with storage, retrieval, and manipulation of data. Accordingly, it is understood that any operation of the client 102 and/or server 104 according to the aspects of the present disclosure may be implemented by computing devices using corresponding instructions stored on or in a non-transitory computer readable medium accessible by the processing system. The different components and operations of the present disclosure may be implemented separately or within predefined groupings using any of the computing devices. Any other divisions and/or combinations of the functionality described herein distributed across multiple computing devices are within the scope of the present disclosure.

Figure 2:
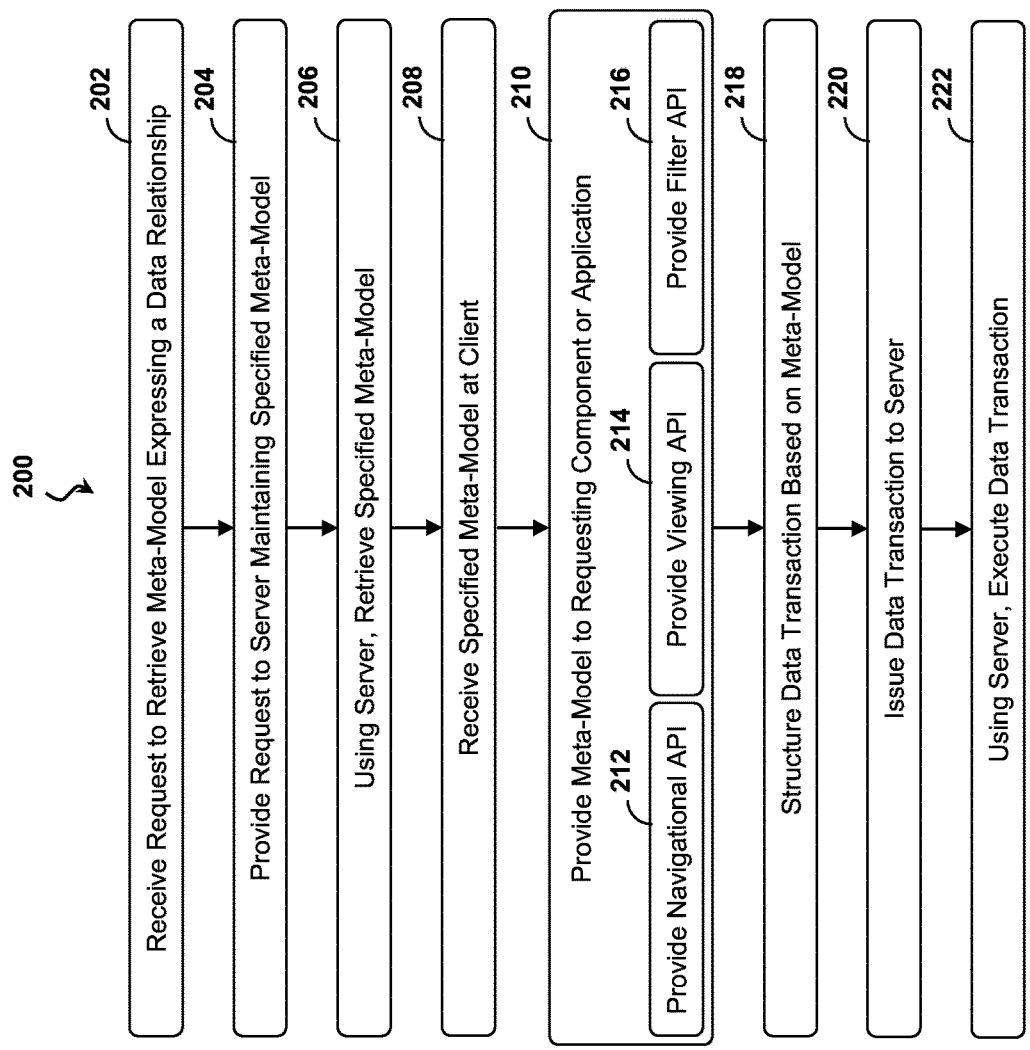
FIG. 2 is a flow diagram of a method of exchanging data between computing systems according to aspects of the present disclosure.

FIG. 2 is a flow diagram of a method 200 of exchanging data between computing systems according to aspects of the present disclosure. It is understood that additional steps can be provided before, during, and after the steps of method 200, and that some of the steps described can be replaced or eliminated for other embodiments of the method. The method 200 is suitable for use in a computing infrastructure such as infrastructure 100 discussed with reference to FIG. 1.

Referring to block 202, a request to retrieve a meta-model is received at a client-side meta-model handler such as handler 112 of FIG. 1. The request may be received from any client component or program including the applications 106 of FIG. 1. Additionally or in the alternative, the meta-model request may be received from any computing system or device communicatively coupled to the client 102. In some embodiments, an intermediary such as the client API 108 of FIG. 1 provides request on behalf of the component or program.

The meta-model request is often part of a transaction directed to storing, retrieving, and/or manipulating a data record on a server 104. For example, the meta-model request may be part of the first phase of a two-phase transaction. In the first phase, the meta-model is requested and exchanged, and in the second phase, data records identified using the meta-model are requested and exchanged. This two-phase exchange allows the requestor to identify all the relevant data records and combine the requests for the records. Thus, clients 102 are able to obtain a drilled down view of the data records without making multiple record requests.

In an exemplary embodiment, an automated support application running on a client 102 initiates a transaction to read or write a data record stored on a remote server 104. The data record contains diagnostic information related to the client 102. In the course of initiating the transaction, the automated support application provides a meta-model request to the meta-model hander 112. The request identifies a version of the meta-model compatible with the application, such as the version in use when the application was released.

Referring to block 204, a meta-model handler 112 forwards the request for the meta-model to the server 104. The request may be transmitted between the client 102 and server 104 over any communications infrastructure such as a LAN, WAN, and/or the Internet. Accordingly, forwarding may include translating the received request of block 202 into a protocol suitable for the respective infrastructure. In various exemplary embodiments, the request is transmitted as a REST-style instruction such as an HTTP URI (e.g., "http:// . . . ") or HTTP GET (e.g., "GET . . . "). REST instructions are well suited for TCP/IP networks in particular, although alternate protocols and instruction types may be equally well suited for any particular application.

Referring to block 206, the server 104 retrieves the requested meta-model and provides it to the client 102. The server 104 may retrieve the meta-model from a collection of models such as the meta-model repository 130 of FIG. 1. In some embodiments, the meta-model is separate and distinct from the data, database, or data structure that the meta-model pertains to. In alternate embodiments, the meta-model is incorporated into the corresponding data, database, or data structure. For example, many relational databases incorporate the relational information into the database holding the corresponding data records. Once the requested meta-model is identified, it is provided to the client 102 over the communications network. Continuing the exemplary embodiment, the requested meta-model is formatted as a response to the requesting REST instruction. Referring to block 208, the meta-model provided by the server 104 is received at the client-side meta-model handler 112.

Referring to block 210, the meta-model is provided by the meta-model handler 112 to the requesting application or component. However, in some embodiments, particularly those where the meta-model is large or complex, the meta-model handler 112 may provide a specific portion of the meta-model rather than the entirety. The meta-model handler 112 may provide a set of instructions in the form of an API that allows the requestor to identify the portions to provide. Examples of such APIs include the navigational API, the viewing API, and the filter API represented by blocks 212, 214, and 216, respectively, as well as other suitable interfaces and instructions.

Referring to block 218, the requesting application or component structures a data transaction with the server based on the meta-model. In the two-phase paradigm, the data transaction is part of the second phase. The data transaction may perform any operation including but not limited to reading, writing, and modifying data records stored on the server 104. One advantage of utilizing a meta-model is the ability to combine multiple data record transactions into a single transaction. This reduces the number of exchanges between the client 102 and server 104. Referring to block 220, the data transaction is issued to the server 104. Referring to block 222, the data transaction is executed by the server 104.

Figure 3:
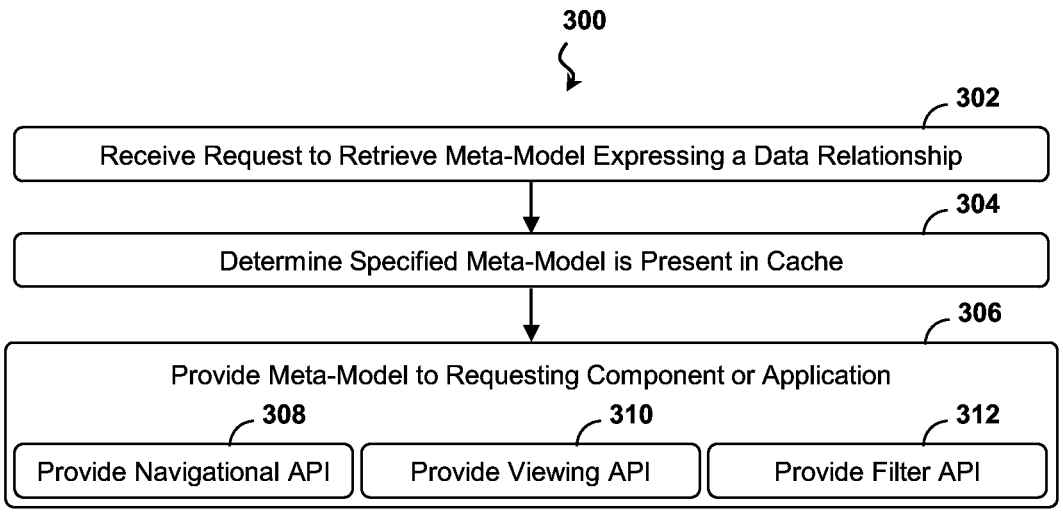
FIG. 3 is a flow diagram of a method of providing a cached meta-model according to aspects of the present disclosure.

Once a meta-model has been retrieved by a client 102, the same meta-model may be provided to subsequent requestors without involving the server 104. FIG. 3 is a flow diagram of a method 300 of providing a cached meta-model according to aspects of the present disclosure. It is understood that additional steps can be provided before, during, and after the steps of method 300, and that some of the steps described can be replaced or eliminated for other embodiments of the method. The method 300 is suitable for use in a computing infrastructure such as infrastructure 100 discussed with reference to FIG. 1.

Referring to block 302, a request to retrieve a meta-model is received by a meta-model handler 112. The request may be substantially similar to that described in block 202 of FIG. 2. Referring to block 304, the meta-model handler 112 determines that the specified meta-model has already been retrieved and is cached within the client 102. Referring to block 306, the meta-model is provided by the meta-model handler 112 from the cache to the requesting application or component substantially as described in block 210. In that regard, the meta-model handler 112 may provide an API that allows the requestor to identify the portions of the model to provide. Examples of such APIs include the navigational API, the viewing API, and the filter API represented by blocks 308, 310, and 312, respectively, as well as other suitable interfaces and instructions. Each requesting entity may specify a portion of the meta-model independently, and thus the portion provided to any specific entity may be different from the portion provided to other entities.

Figure 4:
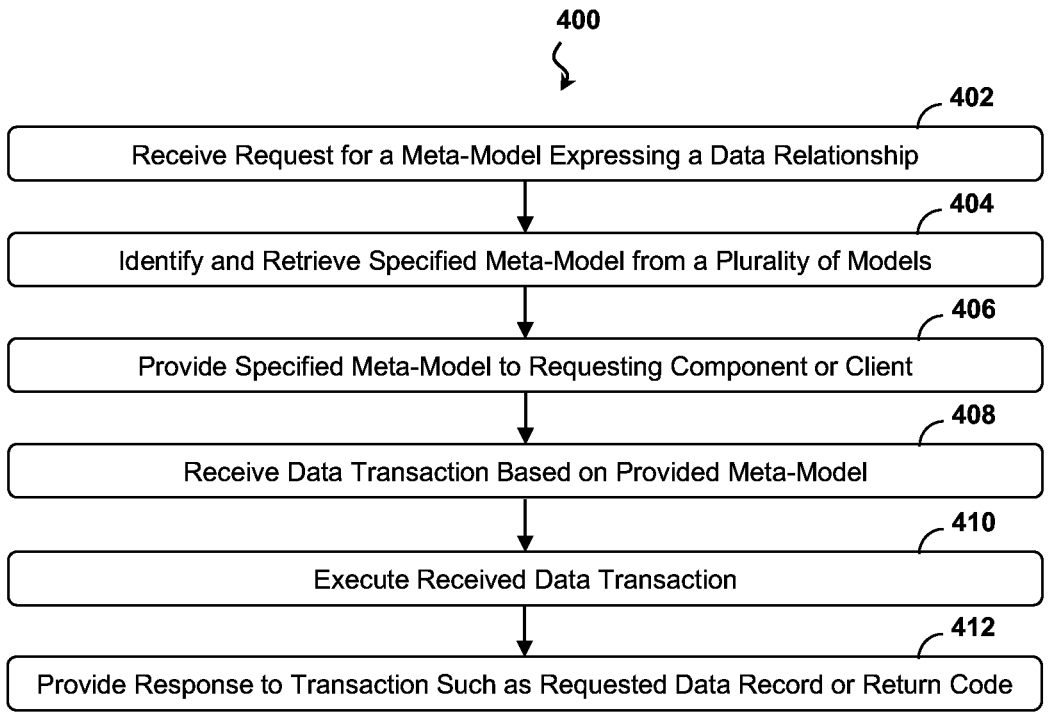
FIG. 4 is a flow diagram of a method of providing meta-model data on demand according to aspects of the present disclosure.

FIG. 4 is a flow diagram of a method 400 of providing meta-model data on demand according to aspects of the present disclosure. It is understood that additional steps can be provided before, during, and after the steps of method 400, and that some of the steps described can be replaced or eliminated for other embodiments of the method. The method 400 is suitable for use in a computing infrastructure such as infrastructure 100 discussed with reference to FIG. 1.

Referring to block 402, a request for a meta-model is received at a server system 104. The request may be received from a component or application of the server 104, and may also be received from a connected client system 102 over a communications network. The request may take any suitable form and in an exemplary embodiment, includes a REST-style instruction communicated over the Internet. In many embodiments, the request specifies a particular meta-model or a particular version of a meta-model. In one such embodiment, an automated support application running on a client requests a particular version of a meta-model that contains relationships that relate to a topology of a deployed computing system.

Referring to block 404, the server 104 identifies and retrieves the specified meta-model from a collection of models such as the meta-model repository 130 of FIG. 1. In some embodiments, the models within the repository 130 are separate and distinct from the data, database, or data structure that the meta-models correspond to. In alternate embodiments, the meta-models are incorporated into the corresponding data, database, or data structure, and the server 104 extracts the specified model from the data records.

Referring to block 406, the server 104 provides the specified meta-model to the requesting component or client 102. Continuing the exemplary embodiment, the meta-model is returned as an XML representation of a GraphML structure and is formatted as a response to the REST-instruction used to request the model.

Referring to block 408, a data transaction is received at the server 104. The data transaction may include any suitable operation or instruction including but not limited to reading, writing, and modifying data records stored on the server 104. The data transaction and any data contained therein are structured according to the meta-model provided in block 406. The transaction may take any suitable form and may be communicated over any suitable communications network. In an exemplary embodiment, the transaction includes a REST-style instruction communicated to the server 104 over the Internet.

Referring to block 410, the data transaction is executed by the server 104. As the transaction may include instructions relating to a data record, the server 104 may interface with one or more data files, databases, or data structures. In some embodiments, executing the instruction includes the server 104 reading or writing a data record of a relational database such as an Oracle Database, MySQL database, Apache HBase database, or Microsoft SQL database. In some embodiments, executing the instruction includes the server 104 reading or writing a data record contained in one or more flat files. In some embodiments, executing the instruction includes the server 104 reading or writing a data record contained in a single flat file distributed across multiple computer systems that make up the server 104.

Referring to block 412, a response to the transaction may be provided by the server 104. In various exemplary embodiments, the response includes a retrieved data record and/or a return code indicating the success or failure of the transaction. In an exemplary embodiment, the response is formatted as a response to the REST-instruction used to communicate the data transaction.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors running in one or more of the client 102 and server 104 execute code to implement the actions described above.

Thus, the present disclosure provides a system and method for transacting data between computing systems using meta-models is provided. In some embodiments, the method for transacting data comprises: requesting, from a computing system, a meta-model expressing a data relationship, wherein the data relationship relates to a topology of a deployed computing system, and wherein the requesting specifies the meta-model from among a plurality of data models stored within the computing system; receiving, from the computing system, the meta-model; providing at least a portion of the meta-model to an application; receiving, from the application, a data transaction based on the meta-model; and issuing the data transaction.

In further embodiments, the method for transacting data comprises: receiving, from a computing system, a request for a meta-model expressing a data relationship, wherein the request specifies the meta-model from among a plurality of data models, and wherein the data relationship relates to a topology of a deployed computing system; retrieving the specified meta-model from the plurality of data models; providing the specified meta-model to the computing system from which the request was received; receiving a data transaction directed to a data record corresponding to the meta-model; and executing the data transaction.

In yet further embodiments, the apparatus comprises: a non-transitory, tangible computer readable storage medium storing a computer program, wherein the computer program has instructions that, when executed by a computer processor, carry out: obtaining a meta-model from another computing system, wherein the meta-model specifies a data relationship relating to a topology of a deployed computing system; providing an interface for specifying a portion of the meta-model to provide to an application; and providing a portion of the meta-model to the application based on the portion being specified via the provided interface.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    requesting a portion of a meta-model for a hierarchical topology of resources of a networked storage system including a cluster, a virtual server, a storage volume and an aggregate of storage devices, from a computing system of the networked storage system by an application from among a plurality of applications,
        wherein the requesting specifies the meta-model from among a plurality of meta-models stored within the computing system and a version of the meta-model from among a plurality of versions for a same meta-model stored by the computing system, where the plurality of versions are determined by a property of a plurality of applications; and
        wherein a navigational application programming interface is used by the application to assemble a path for describing the portion of the meta-model, where the path identifies a root object, a parent object associated with the root object and a child object of the parent object and wherein the parent object, the root object and the child object identify resources of the networked storage system;
    receiving, from the computing system, the portion of the meta-model;
    providing the portion of the meta-model to the application from among the plurality of applications;
        wherein the portion of the meta-model is retrieved by a viewing application programming interface that visualizes meta-model relationships in the portion of the meta-model for the application without interfering with the path assembled by the application using the navigational application programming interface; and
        wherein different portions of the meta-model are provided to different applications using the navigation application programming interface and the viewing application programming interface;
    receiving, from the application, a data transaction for one of reading, writing and modifying data stored by the computing system based on the meta-model; and
    issuing the data transaction.

2. The method of claim 1,
    wherein the application comprises an automated support application, and
    wherein the data transaction exchanges at least one of configuration, log, and performance data of the deployed computing system.

3. The method of claim 1, wherein the computing system comprises a server at an automated support backend.

4. The method of claim 3, wherein the application comprises a client-based automated support application at the deployed system.

5. The method of claim 1, wherein the requesting of the meta-model includes transmitting a request for the meta-model to the computing system utilizing a Representational State Transfer (REST) instruction.

6. The method of claim 5, wherein the receiving of the meta-model includes receiving the meta-model as a response to the REST instruction.

7. The method of claim 1, wherein the first application interface includes a navigational interface operable to specify the first portion of the meta-model based on a path value.

8. A non-transitory, machine readable storage medium having stored thereon instructions for performing a method, comprising machine executable code which when executed by at least one machine, causes the machine to:
    request a portion of a meta-model for a hierarchical topology of resources of a networked storage system including a cluster, a virtual server, a storage volume and an aggregate of storage devices, from a computing system of the networked storage system by an application from among a plurality of applications, wherein the request specifies the meta-model from among a plurality of meta-models stored within the computing system and a version of the meta model from among a plurality of versions for a same meta-model stored by the computing system, where the plurality of versions are determined by a property of a plurality of applications; and wherein a navigational application programming interface is used by the application to assemble a path for describing the portion of the meta-model, where the path identifies a root object, a parent object associated with the root object and a child object of the parent object and wherein the parent object, the root object and the child object identify resources of the networked storage system;

receive, from the computing system, the portion of the meta-model; provide the portion of the meta-model to the application from among the plurality of applications;

wherein the portion of the meta-model is retrieved by a viewing application programming interface that visualizes meta-model relationships in the portion of the meta-model for the application without interfering with the path assembled by the application using the navigational application programming interface; and wherein different portions of the meta-model are provided to different applications using the navigation application programming interface and the viewing application programming interface;

receive, from the application, a data transaction for one of reading, writing and modifying data stored by the computing system based on the meta-model; and issue the data transaction.

9. The non-transitory storage medium of claim 8, wherein the application comprises an automated support application, and wherein the data transaction exchanges at least one of configuration, log, and performance data of the deployed computing system.

10. The non-transitory storage medium of claim 8, wherein the computing system comprises a server at an automated support backend.

11. The non-transitory storage medium of claim 10, wherein the application comprises a client-based automated support application at the deployed system.

12. The non-transitory storage medium of claim 8, wherein the requesting of the meta-model includes transmitting a request for the meta-model to the computing system utilizing a Representational State Transfer (REST) instruction.

13. The non-transitory storage medium of claim 12, wherein the receiving of the meta-model includes receiving the meta-model as a response to the REST instruction.

14. A system comprising:
a memory containing machine readable medium comprising machine executable code having stored thereon instructions; and a processor coupled to the memory, the processor module configured to execute the machine executable code to:

request a portion of a meta-model for a hierarchical topology of resources of a networked storage system including a cluster, a virtual server, a storage volume and an aggregate of storage devices, from a computing system of the networked storage system by an application from among a plurality of applications, wherein the request specifies the meta-model from among a plurality of meta-models stored within the computing system and a version of the meta-model from among a plurality of versions for a same meta-model stored by the computing system, where the plurality of versions are determined by a property of a plurality of applications; and wherein a navigational application programming interface is used by the application to assemble a path for describing the portion of the meta-model, where the path identifies a root object, a parent object associated with the root object and a child object of the parent object and wherein the parent object, the root object and the child object identify resources of the networked storage system;

receive, from the computing system, the portion of the meta-model;

provide the portion of the meta-model to the application from among the plurality of applications;

wherein the portion of the meta-model is retrieved by a viewing application programming interface that visualizes meta-model relationships in the portion of the meta-model for the application without interfering with the path assembled by the application using the navigational application programming interface; and wherein different portions of the meta-model are provided to different applications using the navigation application programming interface and the viewing application programming interface;

receive, from the application, a data transaction for one of reading, writing and modifying data stored by the computing system based on the meta-model; and issue the data transaction.

15. The system of claim 14,
wherein the application comprises an automated support application, and
wherein the data transaction exchanges at least one of configuration, log, and performance data of the deployed computing system.

16. The system of claim 14, wherein the computing system comprises a server at an automated support backend.

17. The system of claim 16, wherein the application comprises a client-based automated support application at the deployed system.

18. The system of claim 14, wherein the requesting of the meta-model includes transmitting a request for the meta-model to the computing system utilizing a Representational State Transfer (REST) instruction.

19. The system of claim 18, wherein the receiving of the meta-model includes receiving the meta-model as a response to the REST instruction.

* * * * *